H. W. COLLENDER.
Billiard Table Cushion.
No. 8,132. Reissued March 19, 1878.
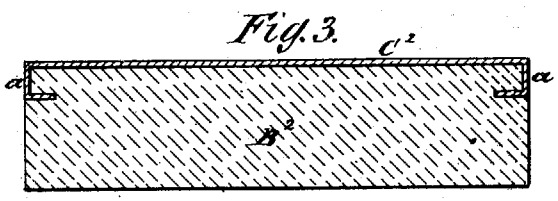
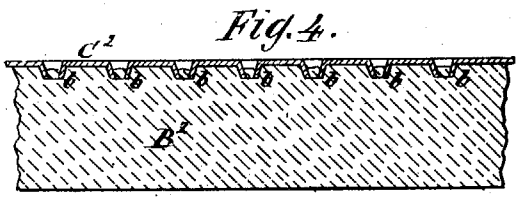
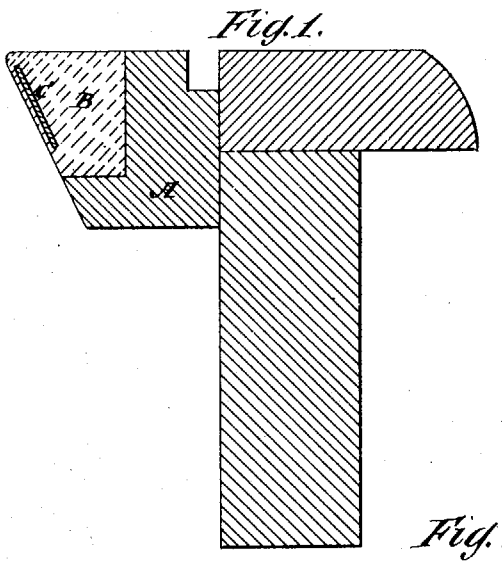
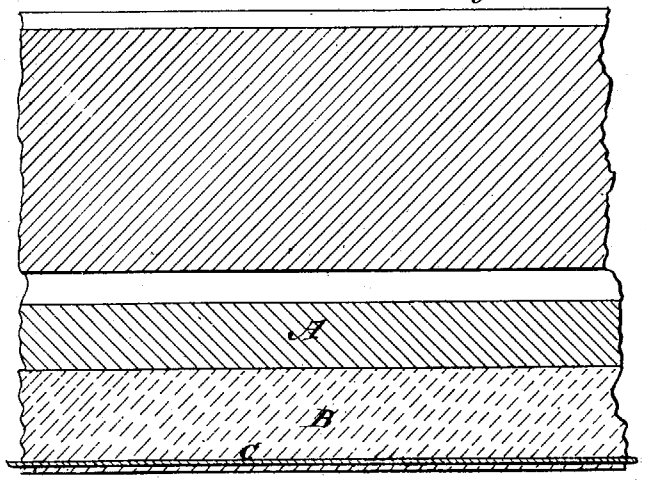
Witnesses:
E. Wolff.
Jacob Felbel
Inventor:
Hugh W. Collender
By his atty. J. Mac Kitcre

UNITED STATES PATENT OFFICE.

HUGH W. COLLENDER, OF NEW YORK, N. Y.

IMPROVEMENT IN BILLIARD-TABLE CUSHIONS.

Specification forming part of Letters Patent No. 19,074, dated January 12, 1858; Reissue No. 2,511, dated March 19, 1867; extended seven years from January 12, 1872; Reissue No. 8,132, dated March 19, 1878; application filed March 14, 1878.

DIVISION A.

*To all whom it may concern:*

Be it known that I, HUGH W. COLLENDER, of the city, county, and State of New York, have invented a new and useful improvement in uniting the comparatively hard substances to the elastic foundations or bodies of billiard-cushions; and I do hereby declare that the following is a full, clear, and exact description of the same, reference being had to the accompanying drawings, forming part of this specification, in which—

Figure 1 is a transverse section of a billiard-cushion constructed after my invention. Fig. 2 is a horizontal section of the same. Figs. 3 and 4 represent several methods of uniting different comparatively hard substances to billiard-cushions after my mode.

Similar letters of reference in each of the several figures indicate corresponding parts.

Prior to my said invention billiard-table cushions have been made of vulcanized india-rubber, with a facing in front, and between the india-rubber and the cloth covering, made of steel, whalebone, cork, or other equivalent flexible substance, which would not permit the ball, in striking, to embed itself in the cushion, but sufficiently elastic to yield to the force of the blow, to compress and bring into action the elastic force of the india-rubber back or body of the cushion; but in such cushions the hard facing was merely placed against the face of the india-rubber back, and there held by the cloth covering, or by some means secured to the cushion-seat.

My said invention consists in making said cushions by uniting the hard facing, such as steel, whalebone, or other equivalent substance, with the india-rubber back while in the green or plastic state, or, as the equivalent therefor, placing the hard substance in a mold, and forming the back by running thereon the preparation of india-rubber in the liquid state, and permitting it there to solidify, and then, in either case, subjecting the india-rubber, with the hard substance adhering thereto or embedded therein, to the required degree of heat to vulcanize it.

This invention enables me to dispense with cement, nails, hinges, or any cloth covering, to retain the comparatively hard substances in proper position on the elastic body. It also enables me to produce a cushion in which will be overcome the disagreeable bang heard when the ball comes in contact with a steel strip fastened at its lower or upper edge. It likewise enables me, without trouble of cementing, to face the front of the steel, or equivalent substance, with a facing of india-rubber, which will deaden the sound of the steel strip, and "gripe" the ball sufficiently to give greater effect to "twisting shots," and also prevent the ball sliding off at an imperfect angle instead of a proper angle when played at a very acute angle against the cushion; and, besides all these advantages of effect, it enables the manufacturer to save a great deal of labor, time, and expense in adjusting and securing the harder substances to the softer ones.

To enable others skilled in the art to make and use my invention, I will proceed to describe its construction and operation.

A, Figs. 1 and 2, represents the cushion-seat of a billiard-table of usual construction; B, the elastic block of rubber, forming the body or back of the cushion. C is a steel strip, with the rubber molded around it completely after my mode—to wit, by placing the steel strip properly in a mold, and allowing the fluid rubber to flow around it. It is desirable, when the cushion is thus constructed, that the rubber which covers the face of the steel strip should be nearly transparent, or so thin that the ball shall not have a chance to embed itself to an extent which will prevent its forming proper angles to fulfill the requirements of the game.

$B^2$, Figs. 3 and 4, represents an elastic block of rubber, and $C^2$ a steel strip on the extreme front face of the block. To produce a cushion of this character, the strip is bent, as shown in Fig. 3, or stamped out, as in Fig. 4, so that holdfasts are formed on it. After being thus prepared it is placed in the mold, and the fluid rubber allowed to flow against and around its angles *a a*, or against it and into its perforations *b b*, as in Fig. 4; or the preparation of india-rubber in the green or plastic state may be applied, and caused to unite with the harder substance by pressure.

It is obvious that after the rubber has flowed or been pressed into the perforations *b*, or around the whole or parts of the harder substance, it will be impossible for the strip to come off.

I do not claim in this application the use of two rubbers of different densities, as this is covered by a former patent of mine; nor do I claim the use of a steel strip, a whalebone strip, or a strip of any other substance which is used with a view of producing a cushion which has an elastic foundation and a comparatively solid face; but

What I claim as my invention, and desire to secure by Letters Patent, is—

Uniting the parts employed in forming combination billiard-cushions by placing the harder or more dense and less elastic substances in a mold, and allowing the melted rubber to flow against, around, or into the harder or more dense and less elastic substances, or causing the plastic rubber, by pressure, to unite with the same, and then vulcanizing the india-rubber, substantially as and for the purposes set forth.

H. W. COLLENDER.

Witnesses:
J. N. McINTIRE,
JACOB FELBEL.